May 30, 1933.  C. H. HAPGOOD  1,911,618
MILKING MACHINE
Filed Jan. 14, 1930

WITNESS:

INVENTOR
Cyrus Howard Hapgood
BY
Busser and Harding
INVENTORS.

Patented May 30, 1933

1,911,618

UNITED STATES PATENT OFFICE

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY

MILKING MACHINE

Application filed January 14, 1930. Serial No. 420,670.

It is known in the art to provide a milking machine comprising a double-chambered teat cup, a pulsation pipe and a secondary pneumatic pulsator connected with, and controlled in its operation by the pulsations in, said pipe, and connected with, and producing pulsations in, the outer chamber of the teat cup, and to provide a vacuum and milk pipe connection from the inner teat cup chamber through the milk claw to the milk pail. It is also known, in such a construction, to provide a vacuum pipe line from the milk pail to the vacuum pump, a primary pneumatic pulsator adapted to produce pulsations in a pipe connected with the secondary pulsator, and electrically operated means, controlled from the pump, for operating the primary pneumatic pulsator. The pulsations from the primary pneumatic pulsator may convey pulsations direct to the outer teat cup chamber, but it is distinctly preferable to provide two pneumatic pulsators, one, a primary pulsator, being directly operated by the electrically operated means and in turn operating another, or secondary pulsator, which produces the pulsations that are conveyed to the outer teat cup chamber. Such a milking machine is disclosed in the Daysh and Hapgood patent, No. 1,405,104, dated January 21, 1922.

In an application filed by me December 24, 1927, Serial No. 242,331, there is set forth an improvement on the Daysh-Hapgood invention, said improvement comprising two separate hose (preferably so integrally connected that they can be handled as a unit) one of which is adapted to function as a vacuum hose and the other as a pneumatic pulsation hose; corresponding ends of the two hose being connected to the milking machine unit and the other corresponding ends of the two hose being connectible respectively with the vacuum conduit and the pulsation conduit of any one of a number of connectors secured to the main vacuum pipe. The vacuum conduit of each connector is adapted to communicate with the vacuum pipe. An electromagnet is mounted on each connector. The magnet, which is intermittently operable, controls the operation of an armature valve, which reciprocates to place the pulsation conduit into communication alternately with the vacuum conduit and the atmosphere. A hand-operable valve in the vacuum conduit, when opened, closes the circuit through the magnet.

The above described construction is open to the objection that a separate connector is required for each cock. The object of the present invention is to provide a construction wherein the connector is secured to the hose. This conception, broadly, is embodied in an application filed by me December 24, 1927, Serial No. 242,330. The present invention, however, is characterized by the fact that the advantages inherent in the construction set forth in my application Serial No. 242,331 are retained and that it embodies other improvements in construction and operation hereinafter particularly described.

In the drawing, which shows a preferred embodiment of the invention—

The secondary pneumatic pulsator (which is preferably but not necessarily employed) may be of the construction shown in the Leitch Patent No. 1,255,186, dated February 5, 1918. It comprises (see Fig. 1) a tubular casing $b$ forming a pulsation chamber communicating with a pulsation pipe $d$ and with a vacuum pipe $e$ and having nipples for connection with the pulsation chambers of the teat cups $a$; a pulsator valve in said chamber operable by pneumatic pulsations communicated through pulsation pipe $d$; and a tubular casing forming a milk chamber $c$ communicating with a milk pipe $f$ and having nipples adapted for connection with the milk chambers of the teat cups $a$. Milk pipe $f$ connects with the interior of the milk pail $g$. If a secondary pulsator is not employed, pipe $d$ may be directly connected to the outer chambers of the teat cups.

On the cover of the milk pail is a casing divided by a web into a pulsator chamber $h$ and a vacuum chamber $i$. The vacuum chamber communicates, through one or more check valves $j$, with the interior of the milk pail. The chambers $h$ and $i$ have nipples adapted to respectively receive the hose $y$ and the hose $z$, which, while shown as independent tubes, may be integrally connected so as to handled as a suit.

Figure 1:
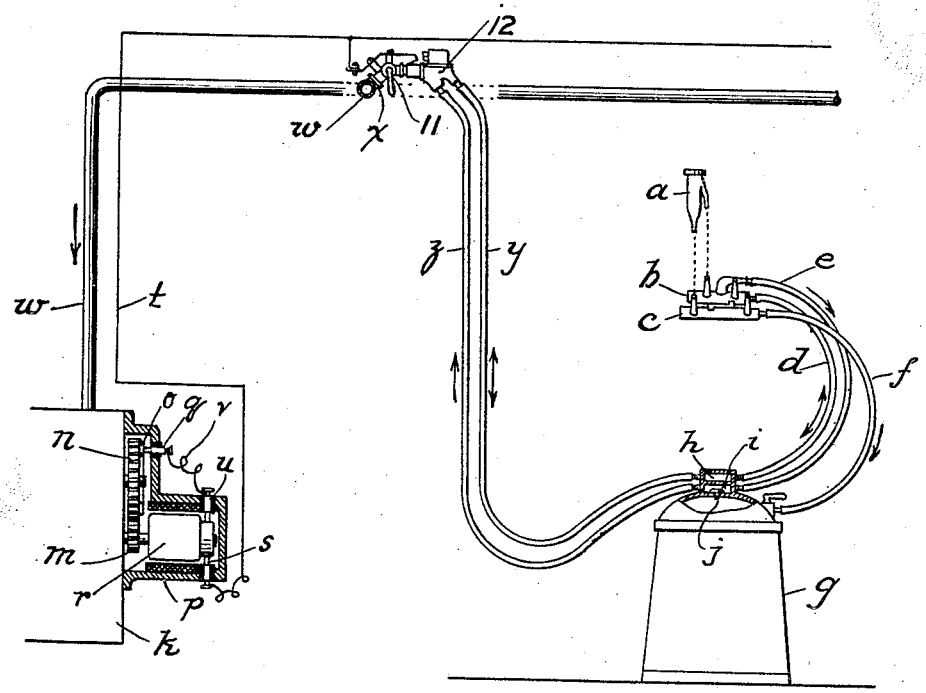
Fig. 1 is a side elevation, partly in section, of a complete milking machine.
Figure 2:
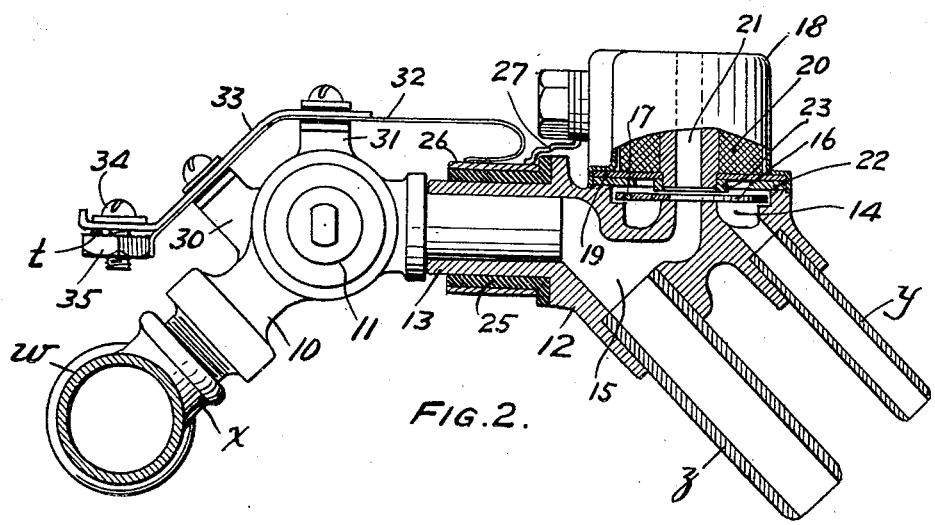
Fig. 2 is a section through the vacuum tube, one of the valve-controlled nozzles secured thereto, the connector and the nozzles to which the ends of the hose are secured.

The vacuum pump $k$ (which may be of the type shown in the Leitch Patents 1,367,554 and 1,378,881 and the Hall Patent 1,374,650 and is diagrammatically shown in Fig. 1) has a pinion $m$ which is in driving connection with a gear $n$ carrying a semi-circular contact strip $o$. Affixed to the pump casing is a casing $p$ enclosing an electric generator $r$ as well as pinion $m$ and gear $n$. When the milking machine is in operation, one of the brushes $s$ of the generator is connected, through an electric conducting line $t$ and other electrical connection hereinafter described, with one terminal of the magnet that actuates the primary pneumatic pulsator, also hereinafter described. The other brush $u$ of the generator is connected, through an electrical connection $v$ with a brush $q$ carried on the pump casing and adapted, in the rotation of gear $n$, to intermittently contact with contact strip $o$, from which, through the pump casing, the current flows through the vacuum pipe line $w$.

Vacuum pipe $w$ is provided with any desired number of nozzles $x$, each of which is threaded to receive one end of a tubular coupler 10, angular in form and provided, at the angle, with a valve 11. The other end of coupler 10 is adapted to be readily connected and disconnected with a portable connector secured to the ends of hose $y$ and $z$.

The portable connector comprises a casing 12 enclosing a vacuum chamber 15, a nozzle 13 extending from said vacuum chamber and adapted for telescopic or slip connection with the outer end of coupler 10, an annular pulsation chamber 14, and nozzles, opening respectively from the pulsation chamber 14 and vacuum chamber 15, to which respectively are fixedly secured the pulsation hose $y$ and the vacuum hose $z$. Vacuum chamber 15 has a port opening upward, and over this port, in pulsation chamber 14, is a disc armature-valve 16, which normally seats on and closes this port. The valve 16 is provided with one or more holes 17 which allow free air communication between the space above and below the valve.

Mounted on the casing 12 is an iron-enclosed electromagnet 20 and its housing and support. The field winding supporting disc 19 (which is made of brass or other non-magnetic material) is secured in the iron magnet-enclosing housing 18 by means of a ring 22, which is secured to the housing by spinning the skirt of the housing over the ring. The housing 18 is secured to the casing 12 by any suitable means, as by screws (not shown) extending through the flange of the housing and ring 22. The field winding surrounds a vertical tube 21 which, at its upper end, is open to the atmosphere or other source of relatively high pressure, and aligns with the upwardly open port in vacuum chamber 15. Tube 21 projects below the field winding support 19. A ring 23 of bronze or other non-magnetic material surrounds the lower end of tube 21 and projectes a short distance (not necessarily more than about .005 inch) below tube 21 and ring 22 (which may be flush with each other) and affords a seat for the valve when it is lifted by energization of the magnet.

Surrounding nozzle 13 is a sleeve 25 of insulating material, and surrounding sleeve 25 is a sleeve 26 of conducting material, which is electrically connected with the magnet through a finger 27.

Projecting from coupler 10 are ears 30, 31. Extending from one ear to the other are a flexible contact strip 32 and a reinforcing contact bar 33. The contact strip and the contact bar are secured to, but insulated from, ears 30, 31. One end of bar 33 and the conducting wire $t$ is clamped between the head of a bolt 34 and a nut 35. The corresponding end of contact strip 32 is bent down against one edge of nut 35. The opposite end of contact strip 32 is bent upon itself and contacts with contact sleeve 26.

When the nozzle 13 of the connector is slipped over the free end of coupler 10, contact sleeve 26 slides into contact with the flexible end of contact strip 32 and an electrical connection is established, through conducting wire $t$, strip 32, sleeve 26 and finger 27 with one pole of the magnet 20; the other pole of the magnet being in electrical connection with the main vacuum pipe $w$ through casing 12 and coupler 10. When valve 11 is opened, the following operation occurs:

When the magnet is energizd, armature-valve 16 is lifted and seats against ring 23 and air is exhausted from hose $y$ through pulsation chamber 14, vacuum chamber 15, coupler 10 and the vacuum pipe line $w$. When the magnet is de-energized, gravity tends to drop valve 16, but in addition to gravity air pressure above valve 16 and suction below it forces valve 16 against the port opening from valve chamber 15 and atmospheric air is admitted, through tube 21 and pulsation chamber 14, to pulsation hose $y$.

There is no possibility of any uncertain action of the armature valve 16 due to the effect of residual magnetism in delaying the withdrawal of said valve from its upper seat when the magnet is de-energized, for the reason that the valve, when drawn against its upper seat, is in contact only with non-magnetic material.

Having now fully described my invention, what I claim and desire to protect by Letters Patent is:

In a milking machine, the combination with a vacuum pipe adapted to be connected with a source of suction, a connector having a vacuum conduit which is provided with two branches one of which is adapted for connection with an element in which it is desired to establish continuous vacuum and the other of which opens in an upward direction, the connector having also a pneumatic pulsation conduit one end of which is adapted for connection with an element in which it is desired to establish pneumatic pulsations and the other end of which opens alongside the said upwardly open branch of the vacuum conduit, an electrically controllable pulsator valve adapted to seat on the upwardly open ends of the two conduits and to connect the pulsation conduit with a source of pressure when seated and to connect the upwardly opening branch vacuum conduit and the pulsation conduit when unseated, an electric circuit, an electro-magnet mounted on the connector and operated by said circuit, a nozzle carried by the connector and communicating with said vacuum conduit, couplers positioned along the vacuum pipe and with any of which said nozzle is adapted to be removably engaged, and means operable to close said circuit to operate said magnet when said nozzle is moved into engagement with a coupler whereby the pulsator valve may be operated by said magnet.

In testimony of which invention, I have hereunto set my hand, at Poughkeepsie, N. Y., on this 12th day of Dec., 1929.

CYRUS HOWARD HAPGOOD.